United States Patent
Izumi et al.

(10) Patent No.: US 8,228,894 B2
(45) Date of Patent: Jul. 24, 2012

(54) SYNCHRONIZATION CIRCUIT, SYNCHRONIZATION METHOD, WIRELESS COMMUNICATION APPARATUS, WIRELESS COMMUNICATION METHOD, AND COMPUTER PROGRAM

(75) Inventors: Seiichi Izumi, Kanagawa (JP); Osamu Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 429 days.

(21) Appl. No.: 12/536,138

(22) Filed: Aug. 5, 2009

(65) Prior Publication Data
US 2010/0040044 A1 Feb. 18, 2010

(30) Foreign Application Priority Data
Aug. 12, 2008 (JP) .............................. P2008-208205

(51) Int. Cl.
*H04J 3/06* (2006.01)
(52) U.S. Cl. .................. 370/350; 370/324; 370/503
(58) Field of Classification Search .......... 370/310–350, 370/503–520
See application file for complete search history.

(56) References Cited

U.S. PATENT DOCUMENTS

| | | | |
|---|---|---|---|
| 2003/0076905 A1* | 4/2003 | Schetelig et al. | 375/343 |
| 2003/0156544 A1* | 8/2003 | Ido | 370/241 |
| 2004/0001430 A1* | 1/2004 | Gardner | 370/210 |
| 2004/0052319 A1 | 3/2004 | Wakamatsu | |
| 2007/0116158 A1* | 5/2007 | Guo et al. | 375/343 |
| 2008/0008100 A1* | 1/2008 | Yamada | 370/241 |
| 2010/0040044 A1* | 2/2010 | Izumi et al. | 370/350 |
| 2011/0293040 A1* | 12/2011 | Dupont et al. | 375/316 |

FOREIGN PATENT DOCUMENTS

| | | |
|---|---|---|
| JP | 2003-69546 | 3/2003 |
| JP | 2004-221940 | 8/2004 |

* cited by examiner

*Primary Examiner* — Steven H Nguyen
*Assistant Examiner* — Kenan Cehic
(74) *Attorney, Agent, or Firm* — Finnegan, Henderson, Farabow, Garrett & Dunner, L.L.P.

(57) ABSTRACT

A synchronization circuit includes a packet detecting unit that searches a received signal for a preamble that is added to the beginning of a packet and that includes given repetitive training sequences to detect the packet; a packet detection reconfirming unit that reconfirms the packet detection by the packet detecting unit by using a received signal in a field in the preamble, subsequent to the field where the packet detecting unit has detected the packet; and a control unit that cancels the packet detection by the packet detecting unit in response to the packet detection reconfirming unit that detects erroneous detection of the packet by the packet detecting unit to cause the packet detecting unit to start detection of a packet from a received signal again.

20 Claims, 12 Drawing Sheets

SYNCHRONIZATION CIRCUIT, SYNCHRONIZATION METHOD, WIRELESS COMMUNICATION APPARATUS, WIRELESS COMMUNICATION METHOD, AND COMPUTER PROGRAM

BACKGROUND OF THE INVENTION

1. Field of the Invention

The present invention relates to a synchronization circuit and a synchronization method that detect an incoming packet transmitted from a communication partner by using the preamble of the packet to perform synchronization, to a wireless communication apparatus and a wireless communication method that receive a packet on the basis of the result of synchronization using the preamble of the packet, and to a computer program. More particularly, the present invention relates to a synchronization circuit, a synchronization method, a wireless communication apparatus, a wireless communication method, and a computer program that estimate a frequency offset, timing, and signal-to-noise ratio (SNR) after a packet is detected from a received signal.

2. Description of the Related Art

Wireless networks draw attention as systems that are free from wiring in wired communication methods in related art. Typical standards concerning the wireless networks include the Institute of Electrical and Electronics Engineers (IEEE) 802.11 and IEEE 802.15. For example, an Orthogonal Frequency Division Multiplexing (OFDM) modulation method, which a multi-carrier method, is adopted in IEEE 802.11a/g as a standard for a wireless local area network (LAN).

Although the modulation method capable of achieving a communication speed up to 54 megabits per second (Mbps) is supported in the IEEE 802.11a/g, a next-generation wireless LAN standard capable of realizing a higher bit rate is demanded. IEEE 802.11n resulting from expansion of the IEEE 802.11 adopts an OFDM-Multi-Input Multi-Output (MIMO) communication method in which multiple antennas are used to perform beamforming in accordance with the channel characteristics.

In wireless communication, an preamble including given repetitive sequences is normally added to the beginning of a packet and a receiver uses the preamble to perform synchronization processing. Specifically, after detection of a preamble allows the packet to be detected, confirmation of reception timing and normalization of the power of a received signal (setting of an automatic gain control (AGC) gain) are precisely performed. After, for example, a frequency offset, an SNR, and a channel are estimated by using a part in the preamble subsequent to the part where the packet has been detected to remove the effects of the frequency offset, the SNR, and the channel, a data symbol is demodulated.

For example, a demodulation timing generation circuit is proposed, which performs AGC and frequency offset correction by using a training signal burst for synchronization added to the beginning of a packet and sets a detection window period for detection of cross correlation to detect a peak of the cross correlation, thereby setting an optimal Fast Fourier Transform (FFT) window, regardless of the status of the transmission path (for example, refer to Japanese Unexamined Patent Application Publication No. 2003-69546).

FIG. 13 shows an example of the frame format in IEEE 802.11a/g. FIG. 14 shows an example of the preamble structure defined in IEEE 802.11a/g.

As shown in FIG. 14, a short training field (STF) of 8.0 μs and a long training field (LTF) of 8.0 μs are added to the beginning of a preamble. In the STF, short preambles $t_1$ to $t_{10}$, which form a short training sequence (STS), are sequentially transmitted in a burst manner. In the LTF, long preambles $T_1$ to $T_2$, which form a long training sequence (LTS), are sequentially transmitted after a guard interval G12 of 1.6 μs.

Normally, a receiver calculates self correlation between the repetitive STS symbols included in the STF and determines that a packet is detected if (the square of) the absolute value of the self correlation value exceeds a predetermined threshold value. The self correlation is calculated, for example, by accumulating the result of complex conjugate multiplication of each received signal by a signal that is received one repetition period before the received signal or by calculating the moving average of the result of the complex conjugate multiplication.

In a common receiver, after four 0.8-microsecond STS symbols are used to set the AGC gain and correct the DC offset, the remaining six STS symbols are used to estimate and correct the frequency offset, detect a packet, and perform coarse timing detection. For example, upon detection of a packet, the remaining preamble field is used to perform timing detection, measurement of the frequency offset, digital gain control, and so on (for example, refer to Japanese Unexamined Patent Application Publication No. 2004-221940, paragraphs 0158 to 0164 and FIG. 19).

As shown in FIG. 13, a Signal part follows the preamble. Control information necessary for decoding an information part (Data part) of the packet is stored in the Signal part. The control information necessary for decoding of the packet is called a Physical Layer Convergence Protocol (PLCP) header. The PLCP header includes a Rate field indicating the transmission speed of the following information part, a Length field indicating the length of the information part, a parity bit, a tail bit of the encoder, and so on.

The receiver analyzes the Signal part to decode the following information part on the basis of the result of decoding of the Rate field and Length field. If the receiver detects a parity error as the result of parity check using the value described in the parity field, the receiver recognizes the packet error to discard the received signal and starts to search for a packet again.

However, when the receiver erroneously detects a packet in response to a signal other than a desired preamble or a noise, there is a problem in that unnecessary decoding is started to prevent detection of a packet until a parity error is recognized. Since it is not possible to detect any desired incoming packet before a parity error is recognized, the communication capacity can be reduced. In addition, if the parity check fails and no parity error is detected, a packet is not possibly detected for a longer time. It is relatively likely to cause a state in which detection of a parity error is suppressed due to any bit error.

The receiver can change the threshold value to be compared with the self correlation value of the STF to easily adjust the sensitivity of the packet detection. Accordingly, the sensitivity of the packet detection may be set so as not to respond to a signal other than a desired preamble or a noise.

However, a decrease in the threshold value used in the self correlation to improve the sensitivity of the packet detection causes the receiver to sensitively respond to, for example, a noise to unnecessarily detect a packet. The unnecessary detection of a packet can unnecessarily suppress the transmission operation in a media access control (MAC) layer to restrict the communication capacity. Also if the communication apparatus is at the reception side of the data frame, the unnecessary detection of a packet restricts the communication capacity because it is necessary to transmit an Acknowledge (ACK) packet.

Conversely, an increase in the threshold value used in the self correlation prevents detection of a packet if the SNR is low to reduce the communication capacity or disable the communication. Furthermore, the time when the AGC gain is fixed upon incoming of a packet is delayed. This can affect the frequency offset and the channel estimation that will be performed later to cause a decoding error.

Consequently, with the method of setting the sensitivity of the packet detection, it is not possible to sufficiently resolve the above problem that the erroneous detection of a packet causes unnecessary processing to be continued to suppress detection of any desired incoming packet during the processing.

SUMMARY OF THE INVENTION

It is desirable to provide an excellent synchronization circuit, synchronization method, wireless communication apparatus, wireless communication method, and computer program capable of detecting an incoming packet transmitted from a communication partner by using the preamble of the packet to preferably perform synchronization.

It is also desirable to provide an excellent synchronization circuit, synchronization method, wireless communication apparatus, wireless communication method, and computer program capable of precisely detecting a packet from a received signal to estimate the frequency offset, timing, and SNR.

It is also desirable to provide an excellent synchronization circuit, synchronization method, wireless communication apparatus, wireless communication method, and computer program capable of preventing continuation of unnecessary processing caused by erroneous detection of a packet to detect a desired incoming packet again.

According to an embodiment of the present invention, a synchronization circuit includes a packet detecting unit that searches a received signal for a preamble that is added to the beginning of a packet and that includes given repetitive training sequences to detect the packet; a packet detection reconfirming unit that reconfirms the packet detection by the packet detecting unit by using a received signal in a field in the preamble, subsequent to the field where the packet detecting unit has detected the packet; and a control unit that cancels the packet detection by the packet detecting unit in response to the packet detection reconfirming unit that detects erroneous detection of the packet by the packet detecting unit to cause the packet detecting unit to start detection of a packet from a received signal again.

The packet detecting unit may calculate a moving average of the result of complex conjugate multiplication of each received signal by a delay signal that is received one repetition period of the given training sequences before the received signal to obtain a self correlation value of the received signal and may determine whether a packet is detected on the basis of the result of comparison between the self correlation values.

The synchronization circuit may further include an estimating unit that estimates at least one of a reception timing of the packet, a frequency offset, and a signal-to-noise ratio by using a received signal in a field in the preamble, subsequent to the field where the packet detecting unit has detected the packet. The control unit may reset the estimation by the estimating unit in response to the packet detection reconfirming unit that detects erroneous detection of the packet by the packet detecting unit to cause the estimating unit to perform the estimation based on a packet that is detected again.

The packet detection reconfirming unit may compare the magnitude (absolute value) of a cross correlation function between a given signal to be included in the preamble and a received signal at a peak position of the cross correlation function with a predetermined threshold value to reconfirm whether a packet is detected by the packet detecting unit.

The synchronization circuit may further include a timing estimating unit that estimates a timing on the basis of a peak position of a cross correlation function between a given signal and a received signal for timing estimation. The packet detection reconfirming unit may compare the magnitude (absolute value) of the cross correlation function estimated by the timing estimating unit at the peak position of the cross correlation function with a predetermined threshold value to reconfirm whether a packet is detected by the packet detecting unit.

The packet detection reconfirming unit may compare the absolute value of a self correlation value of the received signal during the repetition period of the given training sequences with a predetermined threshold value to reconfirm whether a packet is detected by the packet detecting unit.

The synchronization circuit may further include a frequency offset estimating unit that calculates a self correlation value of the received signal during the repetition period of the given training sequences to estimate a phase rotation during the repetition period of the given training sequences from the phase of the self correlation value. The packet detection reconfirming unit may compare the absolute value of the self correlation value calculated by the frequency offset estimating unit with a predetermined threshold value to reconfirm whether a packet is detected by the packet detecting unit.

The synchronization circuit may further include a noise estimating unit that uses the given training sequences of the received signal to calculate a signal-to-noise ratio. The packet detection reconfirming unit may compare the signal-to-noise ratio calculated by the noise estimating unit with a predetermined threshold value to reconfirm whether a packet is detected by the packet detecting unit.

According to another embodiment of the present invention, a synchronization method includes the steps of searching a received signal for a preamble that is added to the beginning of a packet and that includes given repetitive training sequences to detect the packet; estimating at least one of a reception timing of the packet, a frequency offset, and a signal-to-noise ratio by using a received signal in a field in the preamble, subsequent to the field where the packet has been detected; reconfirming the packet detection by using a received signal in a field in the preamble, subsequent to the field where the packet has been detected; and canceling the packet detection to start detection of a packet from a received signal again and resetting the estimation to perform the estimation based on a packet that is detected again, in response to detection in the packet detection reconfirming step of erroneous detection of the packet in the packet detecting step.

According to another embodiment of the present invention, a wireless communication apparatus includes a receiving unit that receives a packet having a preamble including given repetitive training sequences, the preamble being added to the beginning of the packet; a packet detecting unit that searches the received signal for the preamble to detect the packet; an estimating unit that estimates at least one of a reception timing of the packet, a frequency offset, and a signal-to-noise ratio by using a received signal in a field in the preamble, subsequent to the field where the packet detecting unit has detected the packet; a packet detection reconfirming unit that reconfirms the packet detection by the packet detecting unit by using a received signal in a field in the preamble, subsequent to the field where the packet detecting unit has detected the packet; and a control unit that cancels the packet detection by the packet detecting unit to cause the packet detecting unit to start detection of a packet from a received signal again and resets the estimation by the estimating unit to cause the estimating unit to perform the estimation based on a packet that is detected again, in response to the packet detection reconfirming unit that detects erroneous detection of the packet by the packet detecting unit.

According to another embodiment of the present invention, a wireless communication method includes the steps of receiving a packet having a preamble including given repetitive training sequences, the preamble being added to the beginning of the packet; searching the received signal for the preamble to detect the packet; estimating at least one of a reception timing of the packet, a frequency offset, and a signal-to-noise ratio by using a received signal in a field in the preamble, subsequent to the field where the packet has been detected; reconfirming the packet detection by using a received signal in a field in the preamble, subsequent to the field where the packet has been detected; and canceling the packet detection to start detection of a packet from a received signal again and resetting the estimation to perform the estimation based on a packet that is detected again, in response to detection in the packet detection reconfirming step of erroneous detection of the packet in the packet detecting step.

According to another embodiment of the present invention, a computer-readable program causing a computer to perform a process for synchronization of a received signal includes the steps of searching a received signal for a preamble that is added to the beginning of a packet and that includes given repetitive training sequences to detect the packet; estimating at least one of a reception timing of the packet, a frequency offset, and a signal-to-noise ratio by using a received signal in a field in the preamble, subsequent to the field where the packet has been detected; reconfirming the packet detection by using a received signal in a field in the preamble, subsequent to the field where the packet has been detected; and canceling the packet detection to start detection of a packet from a received signal again and resetting the estimation to perform the estimation based on a packet that is detected again, in response to detection in the packet detection reconfirming step of erroneous detection of the packet in the packet detecting step.

The computer-readable program according to the above embodiment of the present invention defines a computer program described in a computer-readable format so as to realize certain processing on a computer. In other words, installing the computer-readable program according to the above embodiment of the present invention in a computer allows a cooperative operation to be realized in the computer, so that a function and advantage similar to those of the synchronization circuit according to the above embodiment of the present invention are achieved.

According to the present invention, it is possible to provide an excellent synchronization circuit, synchronization method, wireless communication apparatus, wireless communication method, and computer program capable of detecting an incoming packet transmitted from a communication partner by using the preamble of the packet to preferably perform synchronization.

According to the present invention, it is also possible to provide an excellent synchronization circuit, synchronization method, wireless communication apparatus, wireless communication method, and computer program capable of precisely detecting a packet from a received signal to estimate the frequency offset, timing, and SNR.

According to the present invention, it is also possible to provide an excellent synchronization circuit, synchronization method, wireless communication apparatus, wireless communication method, and computer program capable of preventing continuation of unnecessary processing caused by erroneous detection of a packet to detect a desired incoming packet again.

In the synchronization circuit, the synchronization method, the wireless communication apparatus, the wireless communication method, and the computer-readable program of the embodiments of the present invention, erroneous detection of a packet can be detected by using the remaining preamble even if the packet detecting unit erroneously detects the packet. Accordingly, it is possible to start detection of a packet again without continuation of unnecessary processing caused by the erroneous detection of the packet.

In the synchronization circuit of the embodiment of the present invention, the reset is introduced during the collection of the information, such as the reception timing of a packet, the frequency offset, and the SNR, necessary for the demodulation even if a packet is erroneously detected in a signal other than a desired preamble to prevent unnecessary decoding of the subsequent symbols.

In the synchronization circuit of the embodiment of the present invention, the presence of a packet is reconfirmed with various indexes calculated in the estimation of the timing, the frequency offset, the SNR, and channel after a packet is detected. Accordingly, it is possible to improve the precision of the packet detection without missing an opportunity for collection of the information necessary for the demodulation.

As described above, according to the present invention, the presence of a packet is reconfirmed with various indexes calculated in the estimation of the timing, the frequency offset, the SNR, and channel after a packet is detected. Accordingly, it is possible to improve the precision of the packet detection without missing an opportunity for collection of the information necessary for the demodulation.

According to the present invention, the reset is introduced during the collection of the information, such as the reception timing of a packet, the frequency offset, and the SNR, necessary for the demodulation even if a packet is erroneously detected in a signal other than a desired preamble to prevent unnecessary decoding of the subsequent symbols. Accordingly, the packet detection can be quickly started again even during the period from the erroneous detection of a packet to the detection of a packet error, during which the packet detection is suppressed in the related art, to increase the communication capacity.

Consequently, according to the present invention, it is possible to improve the sensitivity of the first packet detection to increase the communication capacity in the part where the SNR is low and to expand the communication range.

Further features of the present invention will become apparent from the following description of exemplary embodiments with reference to the attached drawings.

DESCRIPTION OF THE PREFERRED EMBODIMENTS

Embodiments of the present invention will herein be described with reference to the attached drawings.

Figure 1:
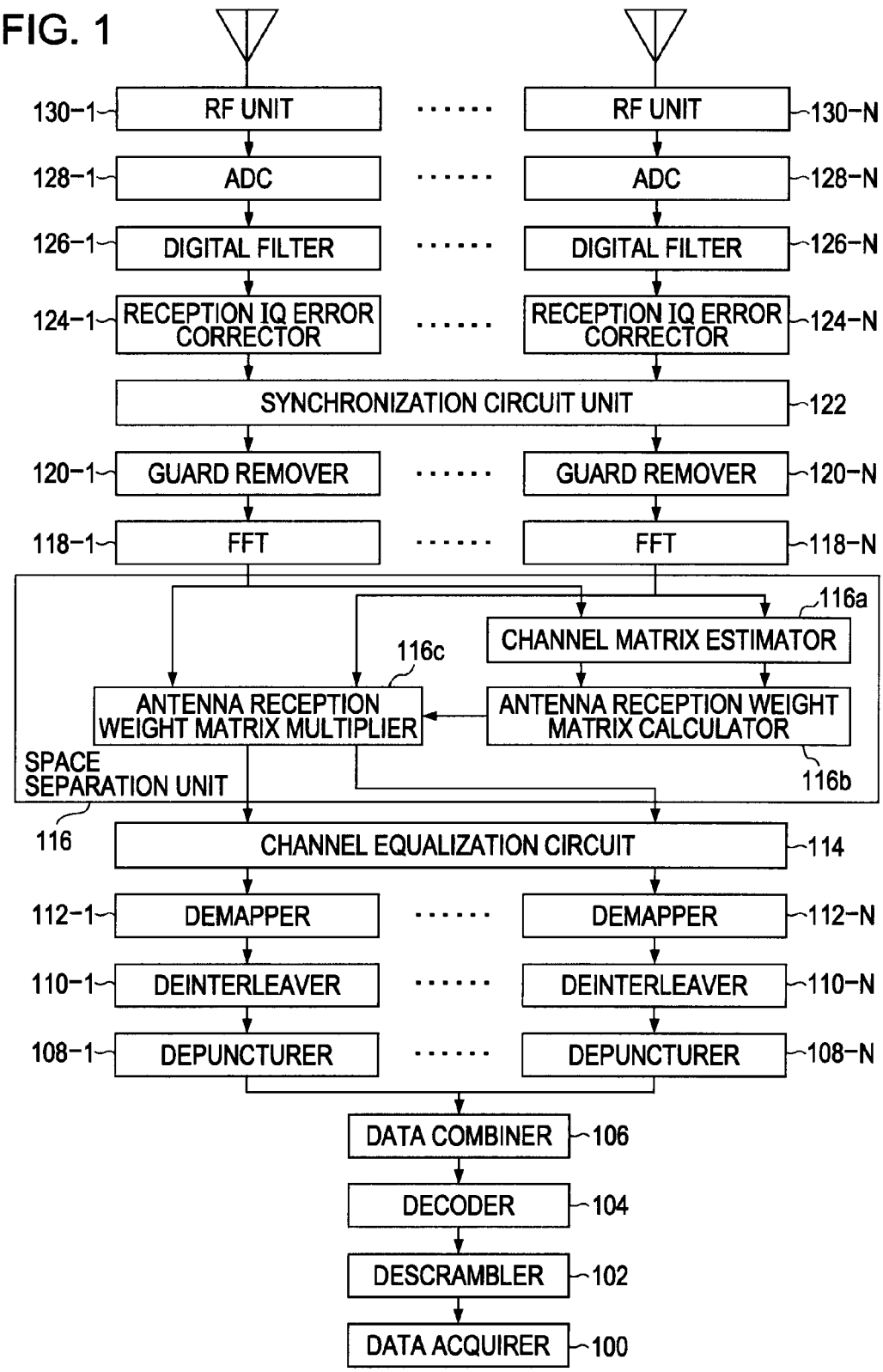
FIG. 1 is a block diagram showing an example of the configuration of a receiver apparatus according to an embodiment of the present invention.

FIG. 1 is a block diagram showing an example of the configuration of a receiver apparatus according to an embodiment of the present invention. The receiver apparatus is an MIMO communication apparatus that includes multiple antennas and that performs transmission beamforming in accordance with the channel characteristics. The receiver apparatus operates as a beamformee receiving a signal that is subjected to the transmission beamforming from an MIMO transmission apparatus (not shown). However, the present invention is not restricted to the MIMO communication apparatus and is also applicable to a Single-Input Single-Output (SISO) communication apparatus including a single transmission-reception antenna.

Figure 2:
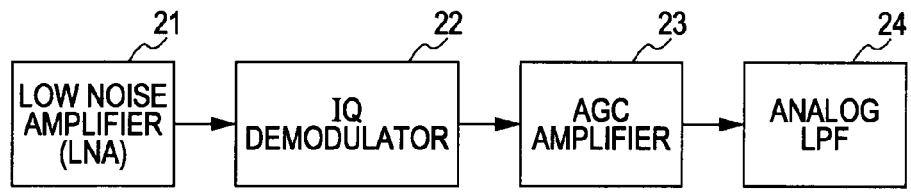
FIG. 2 is a block diagram showing an example of the configuration of an RF unit of each reception antenna branch.

A transmission signal that is subjected to the beamforming is transmitted from a communication partner provided with multiple transmission antennas. A signal that has reached each of N-number reception antennas is subjected to analog processing in a radio-frequency (RF) unit 130 of each reception antenna branch. FIG. 2 is a block diagram showing an example of the configuration of the RF unit 130 of each reception antenna branch. Referring to FIG. 2, the RF unit 130 includes a low noise amplifier (LNA) 21, an in-phase and quadrature-phase (IQ) demodulator 22, an AGC amplifier 23, and an analog low pass filter (LPF) 24. The IQ demodulator 22 down-converts a received signal in an RF frequency band. The AGC amplifier 23 normalizes the received signal so that the power of the received signal is within the dynamic range of an analog-to-digital converter (ADC) 128 downstream of the RF unit 130 in each reception antenna branch. The analog LPF 24 removes signal components outside a desired frequency band.

Referring back to FIG. 1, the ADC 128 converts the analog received signal into a digital signal and supplies the digital signal to a digital filter 126 of each reception antenna branch. The digital filter 126 performs band limitation.

A reception IQ error corrector 124 of each reception antenna branch corrects an IQ error. The IQ error includes an IQ amplitude error caused by a difference in amplitude between an I channel signal and a Q channel signal in the IQ demodulator functioning as the down-converter and an IQ phase error. If the IQ phase error occurs, the I axis and the Q axis shift from the right angle. No correction of such IQ errors increases the error vector magnitude (EVM) of the received signal to cause a degradation of the communication quality.

A synchronization circuit unit 122 common to the reception antenna branches performs, for example, packet detection, timing detection, frequency offset correction, and noise estimation.

A guard remover 120 of each reception antenna branch removes a guard interval added to the beginning of the data transmission field. A Fast Fourier Transformer (FFT) 118 of each reception antenna branch converts the time-axis signal into a frequency-axis signal.

A space separation unit 116 common to the reception antenna branches performs spatial separation of the received signal that is subjected to the beamforming. In the space separation unit 116, a channel matrix estimator 116a creates an estimation channel matrix H from the training sequence for exciting a channel matrix received by each reception antenna branch. An antenna reception weight matrix calculator 116b calculates an antenna reception weight matrix W on the basis of the estimation channel matrix H in the forward direction, created by the channel matrix estimator 116a. An antenna reception weight matrix multiplier 116c performs matrix multiplication of a reception vector formed of each reception stream by the antenna reception weight matrix W to perform spatial decoding of a spatial multiplexed signal that is subjected to the beamforming, thereby generating a signal sequence for every stream. Although a Minimum Mean Square Error (MMSE) algorithm is used as the method of calculating the antenna reception weight matrix W, Singular Value Decomposition (SVD), Eigenvalue Decomposition (EVD), or another matrix decomposition method may be used as the method.

A channel equalization circuit 114 common to the reception antenna branches performs, for example, correction of the remaining frequency offset and channel tracking to the signal sequence for every stream. A demapper 112 of each reception antenna branch demaps the received signal in the IQ signal space. A deinterleaver 110 of each reception antenna branch deinterleaves the received signal. A depuncturer 108 of each reception antenna branch performs depuncutre in a predetermined data rate.

A data combiner 106 combines multiple reception streams into one stream. The data combining process is an inverse operation of data separation at the transmission side. A decoder 104 performs error correction decoding. A descrambler 102 descrambles the received signal. A data acquirer 100 acquires the received data.

The physical (PHY) layer in the IEEE 802.11n adopting the MIMO communication method has a high-throughput (HT) transmission mode that entirely differs from the IEEE 802.11a/g in the modulation and coding scheme (MCS), such as the demodulation method or the encoding method. The high-throughput transmission mode is also referred to as an "HT mode". The PHY layer in the IEEE 802.11n also has an operation mode in which data transmission is performed in the same packet format and the same frequency domain as in the IEEE 802.11a/g. This mode is also referred to as a "legacy mode". The HT mode includes an operation mode called a mixed mode (MM) that is compatible with a terminal in related art conforming to the IEEE 802.11a/g (also referred to as a "legacy terminal").

Figure 3:
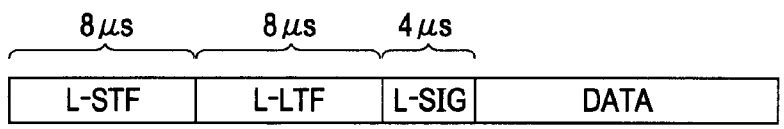
FIG. 3 shows an example of the packet format in a legacy mode.
Figure 4:
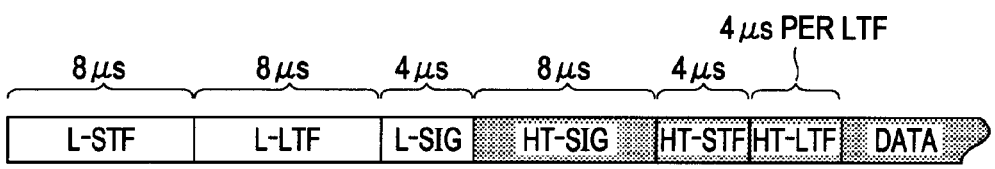
FIG. 4 shows an example of the packet format in an MM operation mode.

FIG. 3 shows an example of the packet format in the legacy mode. FIG. 4 shows an example of the packet format in the MM. In the examples in FIGS. 3 and 4, one OFDM symbol corresponds to four microseconds.

Figure 13:
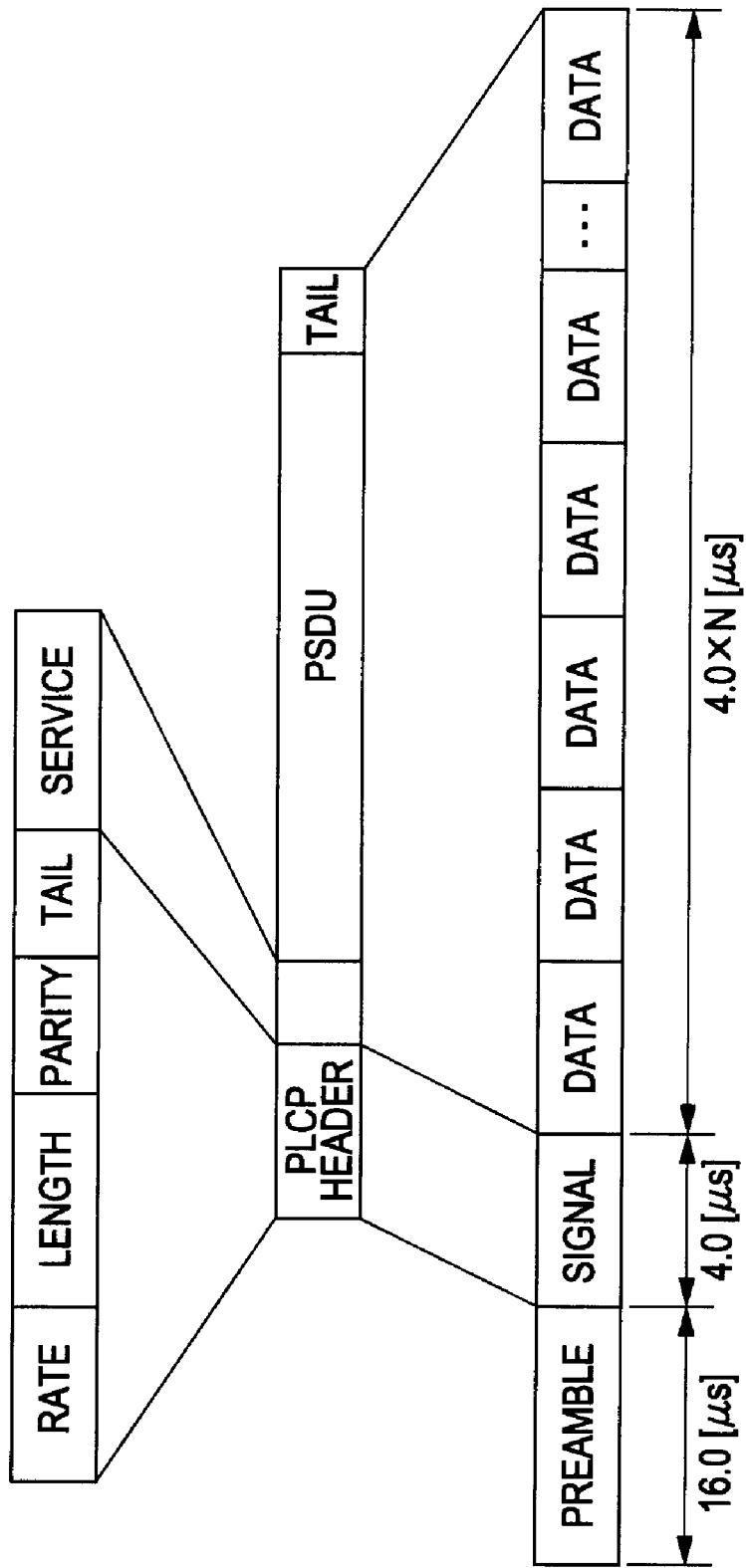
FIG. 13 shows an example of the frame format in IEEE 802.11a/g.
Figure 14:
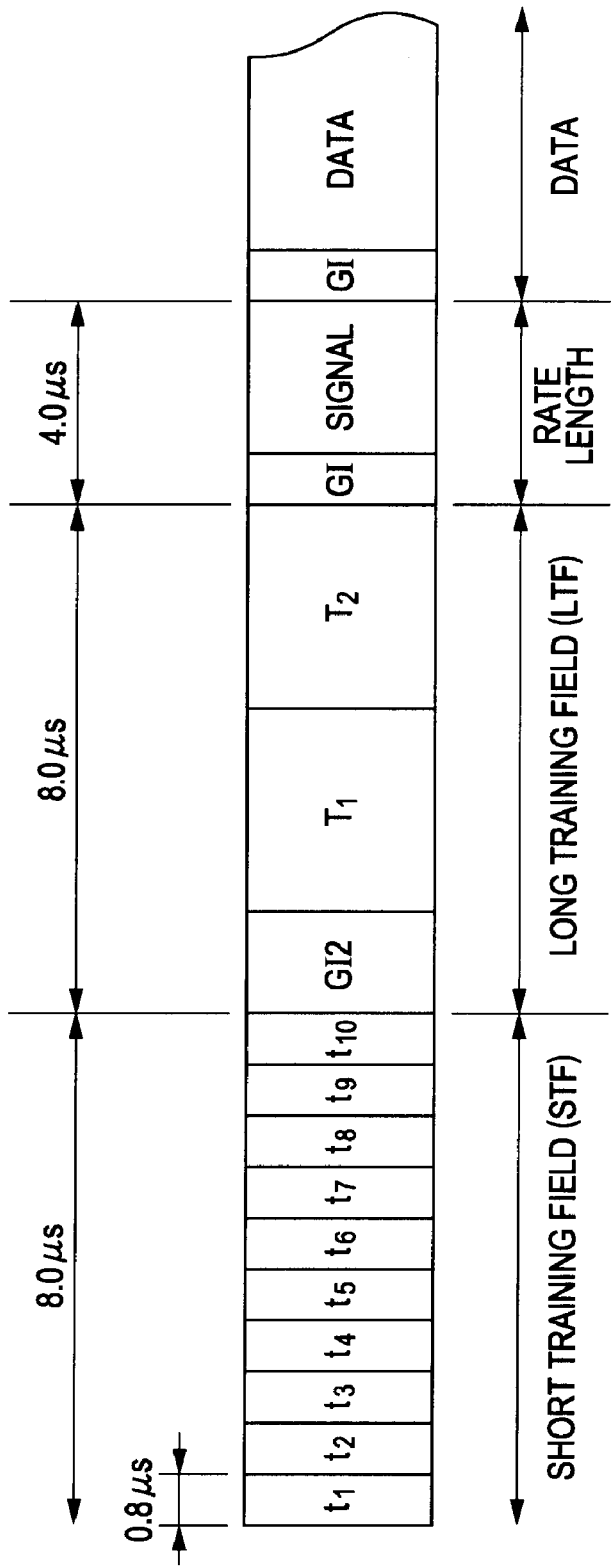
FIG. 14 shows an example of the preamble structure defined in IEEE 802.11a/g.

The packet (also referred to as a "legacy packet") in the legacy mode shown in FIG. 3 has the same format as in the IEEE 802 11a/g (refer to FIGS. 13 and 14). A legacy preamble is added to the header of the legacy packet. The legacy preamble includes a legacy STF (L-STF) including the given repetitive STS symbols for packet detection, a legacy LTF (L-LTF) including the given repetitive LTS symbols for synchronization and channel equalization, and a legacy signal field (L-SIG) in which the transmission rate and the data length are described. Payload (data) follows the legacy preamble.

The header of the packet (also referred to as an "MM packet") shown in FIG. 4 includes a legacy preamble having the same format as in the IEEE 802.11a/g, a preamble (also referred to as an "HT preamble") having a format specific to the IEEE 802.11n (also referred to as an "HT format"), and a data part. In the MM packet, the part corresponding to the PHY payload in the legacy packet has the HT format. The HT preamble and the PHY payload are recursively included in the part having the HT format.

The HT preamble includes an HT-SIG, an HT-STF, and an HT-LTF. Control information, such as the MCS applied to the PHY payload (PHY service data unit (PSDU)) and the data length of the payload, necessary for interpretation of the HT format is described in the HT-SIG. The HT-STF includes training symbols for improving the AGC in the MIMO system. The HT-LTF includes training symbols for channel estimation for every input signal that is subjected to spatial modulation (mapping) at the receiver side.

In the case of the MIMO communication using two or more transmission branches, it is necessary for the receiver apparatus to estimate a channel for every transmission-and-reception antenna where a received signal is spatially separated in order to acquire a channel matrix. At the transmitter side, the HT-LTF is transmitted in time division from each transmission antenna. Accordingly, one or more HT-LTF fields are added depending on the number of spatial streams.

The legacy preamble in the MM packet has the same format as that of the preamble in the legacy packet (refer to FIG. 14) and data is transmitted in a transmission method that can be decoded by the legacy terminal. In contrast, in the part in the HT format including the HT preamble and the subsequent part, data is transmitted in a transmission method that is not supported by the legacy terminal.

In both the packet formats of the legacy packet shown in FIG. 3 and of the MM packet shown in FIG. 4, the legacy preamble shown in FIG. 14 is added to the head of the packet. The synchronization circuit unit 122 calculates the self correlation in the L-STF including ten 0.8-microsecond STS symbols to start the packet detection and perform the synchronization processing.

Figure 5:
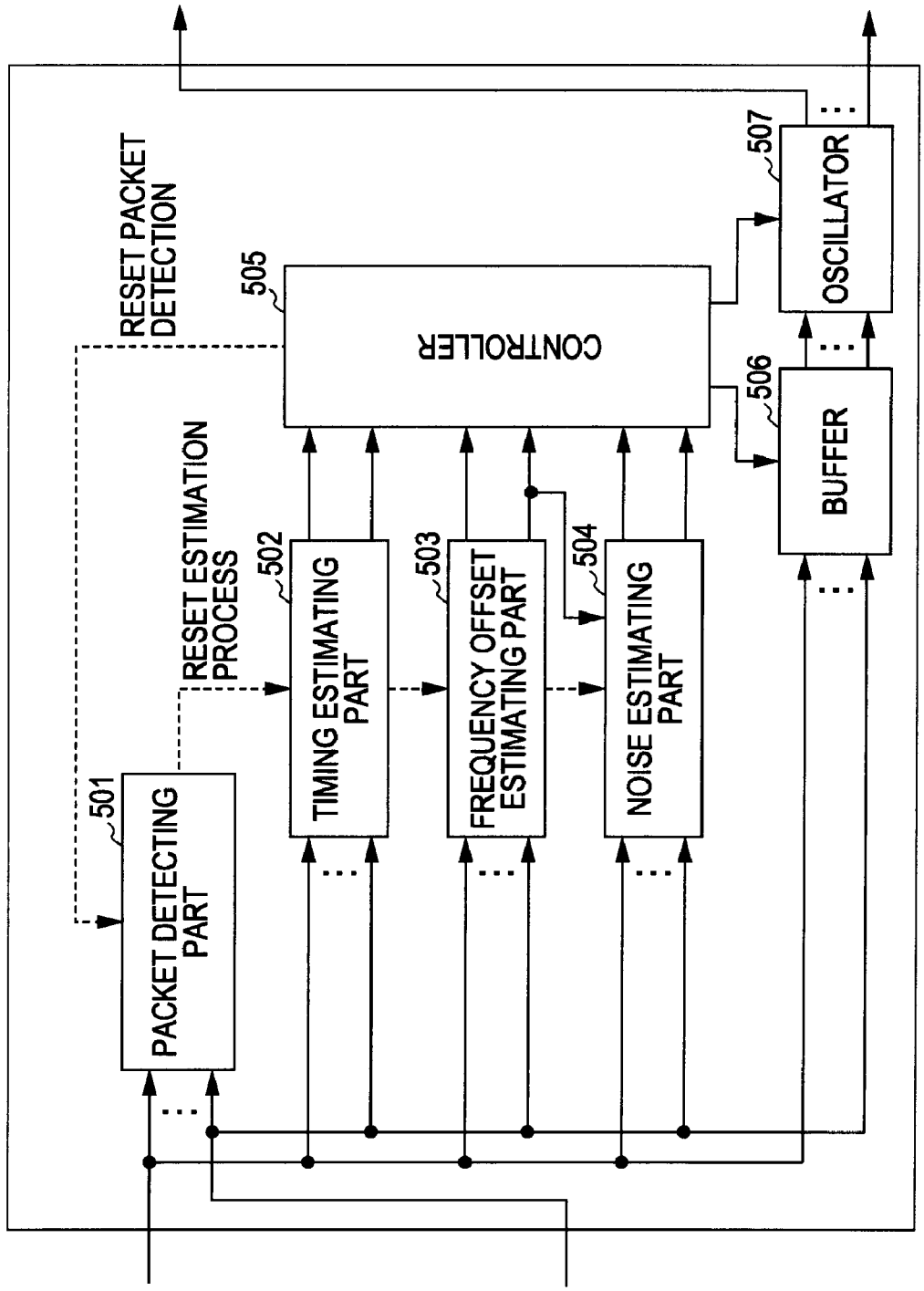
FIG. 5 is a block diagram showing an example of the internal configuration of a synchronization circuit unit.

FIG. 5 is a block diagram showing an example of the internal configuration of the synchronization circuit unit 122. Referring to FIG. 5, a packet detecting part 501 searches for a preamble signal at the beginning of a packet while received signals through the respective branches are sequentially stored in a buffer 506. Upon detection of a packet by the packet detecting part 501, a timing estimating part 502, a frequency offset estimating part 503, and a noise estimating part 504 estimate a synchronization timing, a frequency offset, and a noise, respectively, during the part subsequent to the preamble signal.

A controller 505 reads out a received data sample from the buffer 506 on the basis of the detection timing estimated by the timing estimating part 502 and corrects an oscillation signal generated by an oscillator 507 on the basis of the frequency offset value estimated by the frequency offset estimating part 503 during the reception of the packet to output the received data.

According to the present embodiment of the present invention, even if the packet detecting part 501 in the synchronization circuit unit 122 detects a packet, a mechanism for reconfirming the packet detection is introduced by using the part corresponding to the remaining preamble to detect a packet that is erroneously detected. Specifically, the controller 505 determines that no packet exists despite the fact that the packet detecting part 501 detects a packet if the index supplied from each of the timing estimating part 502, the frequency offset estimating part 503, and the noise estimating part 504 is lower than a reference value and indicates erroneous detection of the packet. Since the packet detecting part 501 starts to search for a packet again in response to the erroneous detection of the packet, continuation of unnecessary processing caused by the erroneous detection of the packet is suppressed to prevent a reduction in the communication capacity.

Figure 6:
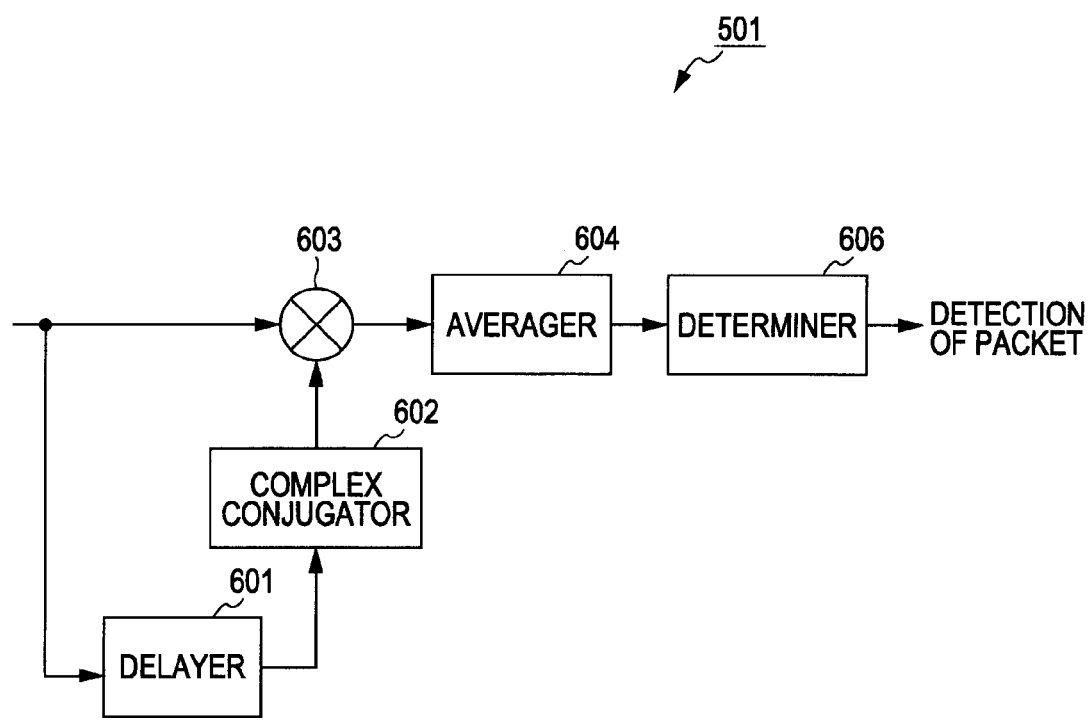
FIG. 6 is a block diagram showing an example of the internal configuration of a packet detecting part.
Figure 7:
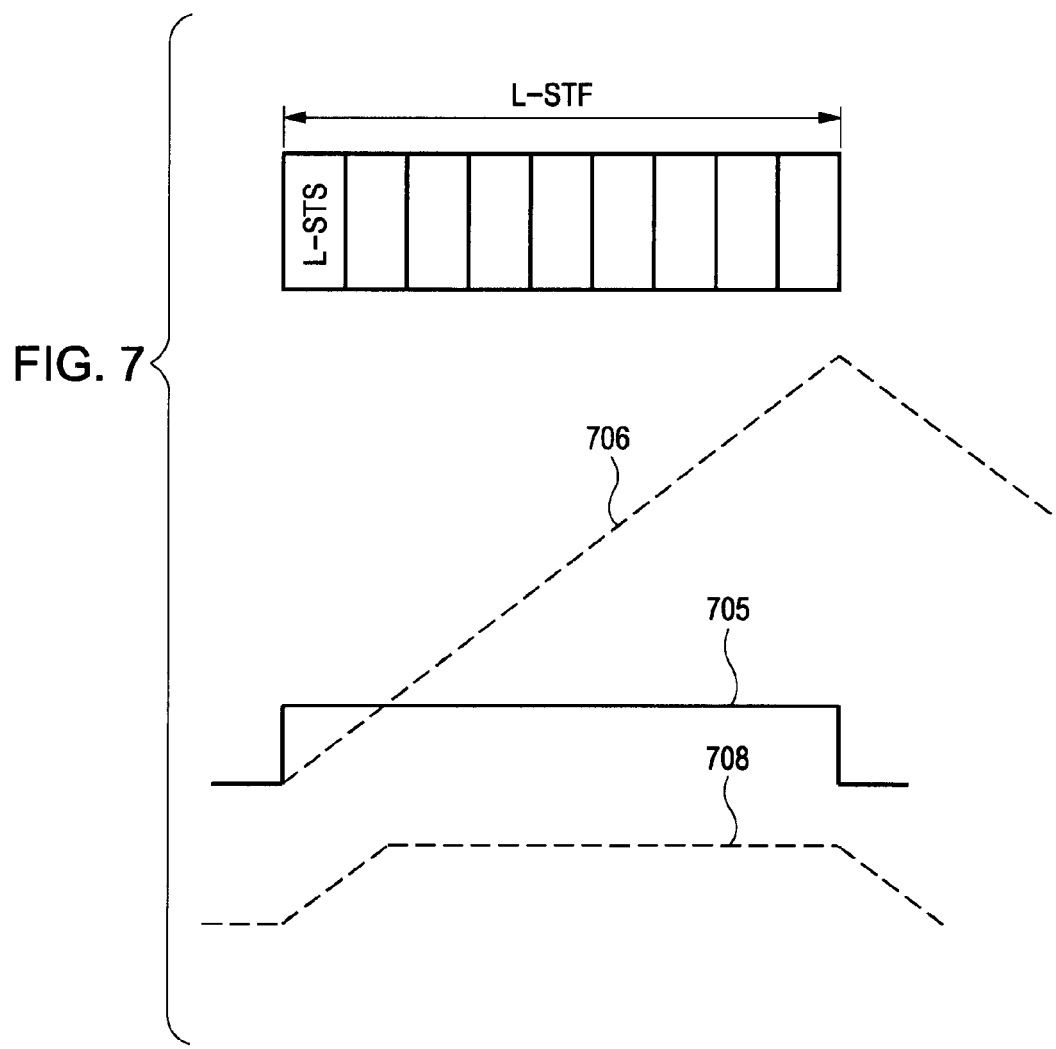
FIG. 7 illustrates an operation timing chart of the packet detecting part shown in FIG. 6.

FIG. 6 is a block diagram showing an example of the internal configuration of the packet detecting part 501. FIG. 7 illustrates examples of outputs from the functional modules in the packet detecting part 501 shown in FIG. 6.

Referring to FIG. 6, a delayer 601 holds received signals at intervals of 0.8 µs corresponding to the repetition period of the STS and outputs a delay signal. A complex conjugator 602 calculates the complex conjugate of the delay signal. A multiplier 603 performs complex conjugate multiplication of the received signal by a delay signal corresponding to the repetition period (0.8 µs) of the STS.

An averager 604 calculates the moving average of the product output from the multiplier 603 using the entire L-STF as the moving average period to obtain a self correlation value. A determiner 606 detects a packet at the time when the self correlation value exceeds a predetermined threshold value.

The complex conjugate multiplication of the received signal by the delay signal, performed by the multiplier 603, generates a rectangular shaped signal having a constant value during a period from a time 0.8 µs after the repetition of the STS symbols in the L-STF is started to a time when 8.0 µs elapsed since the repetition of the STS symbols in the L-STF is started and when the L-STF ends, as shown by a reference numeral 705 in FIG. 7. The calculation of the moving average during 7.2 µs corresponding to the above period by the averager 604 generates a triangle shaped signal resulting from integration of the rectangular shaped signal, as shown by reference numeral 706 in FIG. 7. The determiner 606 compares the moving average value in the L-STF with the threshold value to determine whether a packet is detected.

Figure 8:
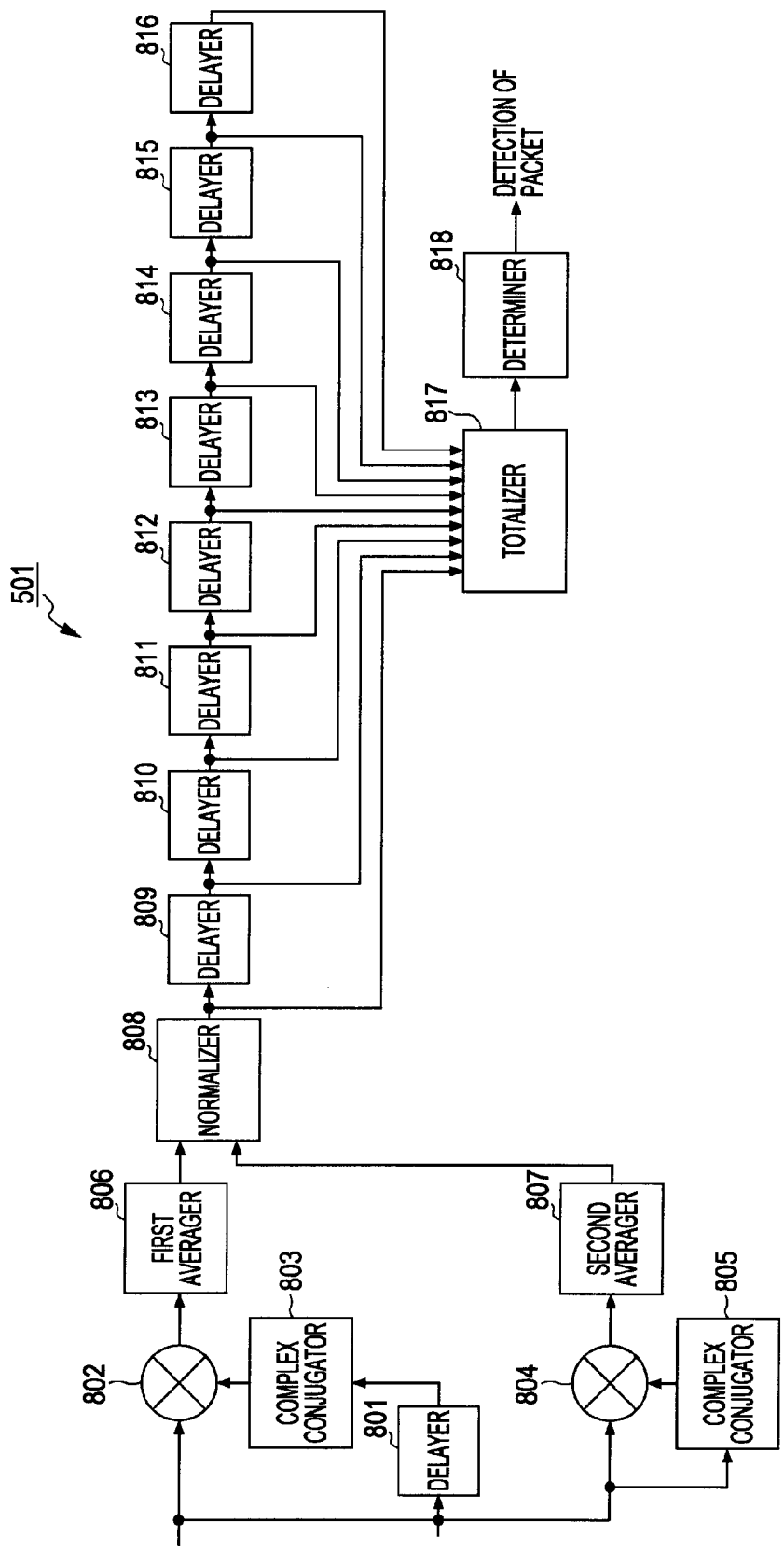
FIG. 8 is a block diagram showing another example of the internal configuration of the packet detecting part.

FIG. 8 is a block diagram showing another example of the internal configuration of the packet detecting part 501.

Referring to FIG. 8, a delayer 801 holds received signals at intervals of 0.8 µs corresponding to the repetition period of the STS and outputs a delay signal. A complex conjugator 803 calculates the complex conjugate of the delay signal output from the delayer 801. A multiplier 802 performs the complex conjugate multiplication of the received signal by the delay signal corresponding to the repetition period (0.8 µs) of the STS. A first averager 806 calculates the moving average of the product output from the multiplier 802 using one repetition period of the STS as the moving average period. The moving average during one repetition period denoted by reference numeral 708 in FIG. 7 exhibits a trapezoidal shape that is lower than the moving average during four microseconds corresponding to five repetition periods.

A complex conjugator 805 calculates the complex conjugate of each received signal. A multiplier 804 performs the complex conjugate multiplication of the received signals to obtain the power of the received signals. A second averager 807 calculates the moving average of the product output from the multiplier 804 during two repetition periods of the STS to obtain the average reception power (the moving average of the square of the received signal sample).

A normalizer 808 sequentially normalizes the self correlation value output from the first averager 806 with the average reception power output from the second averager 807. The receiver apparatus sets the AGC gain to the maximum value to wait for reception of a packet, and the effect of a variation in the AGC gain at the beginning of the packet can be eliminated by the normalization.

Figure 9:
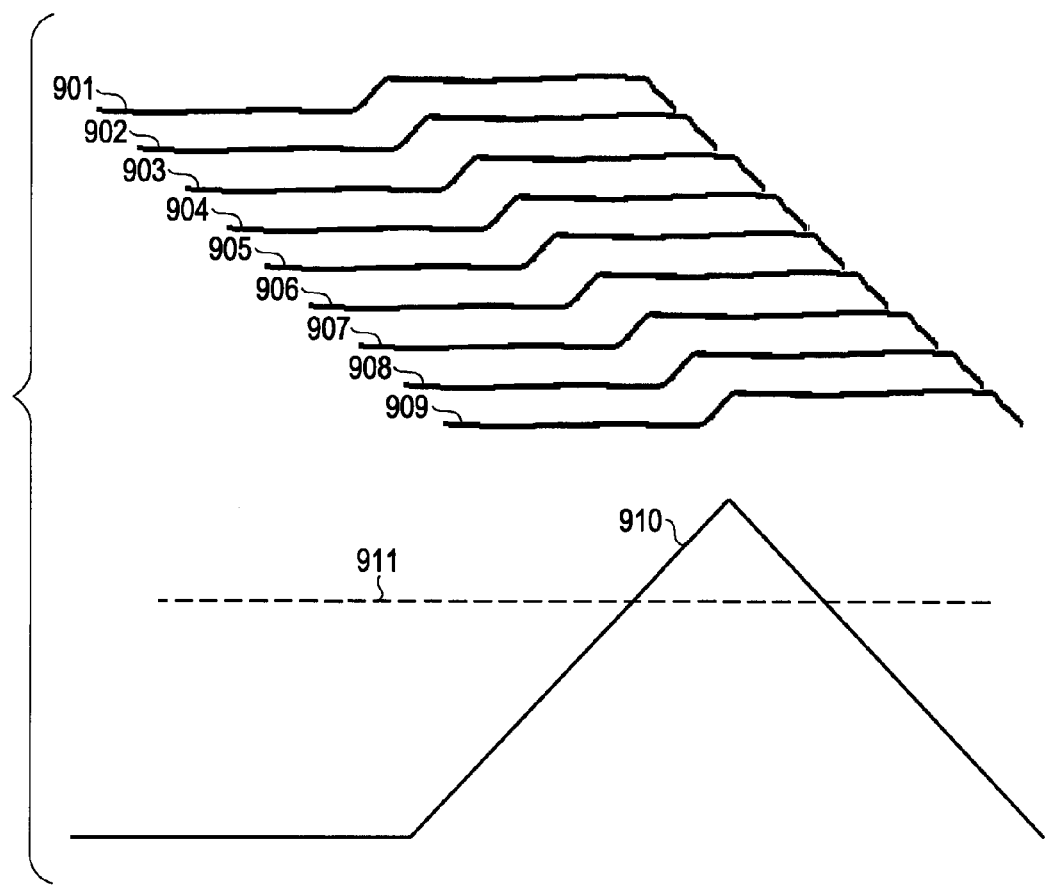
FIG. 9 illustrates a state in which each of eight delayers adds a delay corresponding to a repetition period (0.8 μs) to a moving average that is normalized by a normalizer and that uses one repetition period as the moving average period.

Eight delayers 809 to 816 that are connected in series to each other are delay elements each having a delay time of 0.8 μs corresponding to the repetition period of the STS. The number of the delayers 809 to 816 corresponds to the repetition times of the STS. FIG. 9 illustrates a state in which each of the eight delayers 809 to 816 adds a delay corresponding to the repetition period (0.8 μs) to the moving average that is normalized by the normalizer 808 and that uses one repetition period as the moving average period. Referring to FIG. 9, reference numeral 901 denotes an output from the normalizer 808 and reference numerals 902 to 909 denote the respective outputs from the delayers 809 to 816.

A totalizer 817 calculates the sum of the output 901 from the normalizer 808 and the outputs 902 to 909 from the delayers 809 to 816. The calculation of the sum corresponds to calculation of normalized self correlation using the entire L-STF as the moving average period and generates a triangle shaped signal denoted by reference numeral 910 in FIG. 9. A determiner 818 compares the output from the totalizer 817 with a predetermined threshold value (denoted by reference numeral 911 in FIG. 9) to determine whether a packet is detected.

Figure 10:
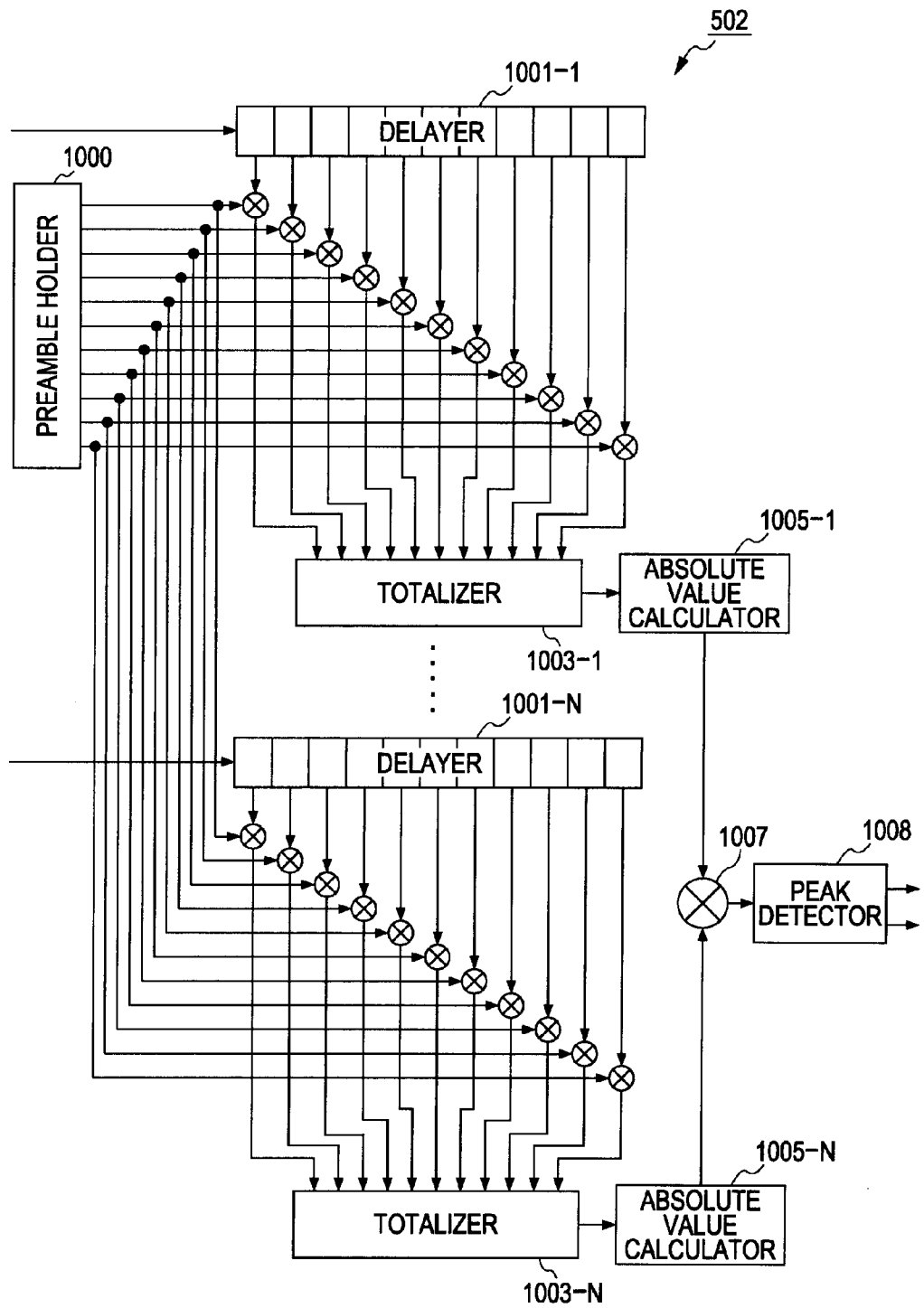
FIG. 10 is a block diagram showing an example of the internal configuration of a timing estimating part in the synchronization circuit unit shown in FIG. 5.

FIG. 10 is a block diagram showing an example of the internal configuration of the timing estimating part 502 in the synchronization circuit unit 122 shown in FIG. 5. The timing estimating part 502 is activated after the packet detecting part 501 detects a packet in the L-STF of the preamble conforming to the IEEE 802.11a/n and calculates the cross correlation with a given signal in the L-LTF to perform the timing estimation based on the peak of the cross correlation. According to the present embodiment of the present invention, if the absolute value of the peak calculated by the timing estimating part 502 is lower than a predetermined threshold value, the controller 505 cancels the detection of the packet to start detection of a packet again.

Referring to FIG. 10, a delayer 1001 of each reception antenna branch includes multiple delay elements each having a delay time corresponding to the sample period. The multiple delay elements are connected in series to each other. The delayer 1001 adds the delay time corresponding to the timing estimation period. A preamble holder 1000 holds the pattern of the LTS defined in the standard (that is, a given signal pattern for the timing estimation). Each delay element in the delayer 1001 adds a delay to each received signal sample and each delay signal is multiplied by the pattern held by the preamble holder 1000. A totalizer 1003 of each reception antenna branch calculates the sum of the delay signals subjected to the multiplication to obtain the inner product in order to calculate the cross correlation value.

In each reception antenna branch, the inner product is calculated in the above manner each time a new received signal sample is received. An absolute value calculator 1005 of each reception antenna branch calculates the absolute value of the inner product. An adder 1007 adds up the absolute values of the cross correlation values calculated for every reception antenna branch to obtain a cross correlation function. A peak detector 1008 sets each peak position of the cross correlation function as the estimating timing. In addition, the peak detector 1008 supplies the position and the magnitude (the absolute value or the square of the absolute value) of each peak of the cross correlation function to the controller 505.

The controller 505 converts the peak position into a data readout address in the buffer 506 to use the data readout address in reading of the OFDM symbol. In addition, the controller 505 compares the magnitude of the cross correlation function at the peak position of the cross correlation function with a predetermined threshold value to reconfirm whether the pattern of the L-LTF is detected.

If the magnitude of the cross correlation function is lower than the predetermined threshold value, the controller 505 issues a reset instruction to the packet detecting part 501 to cancel the detection of the packet and causes the packet detecting part 501 to start detection of a packet from a received signal again. The controller 505 also issues a reset instruction to each of the timing estimating part 502, the frequency offset estimating part 503, and the noise estimating part 504 to cause each estimating part to perform the estimation based on a packet that is detected again.

Figure 11:
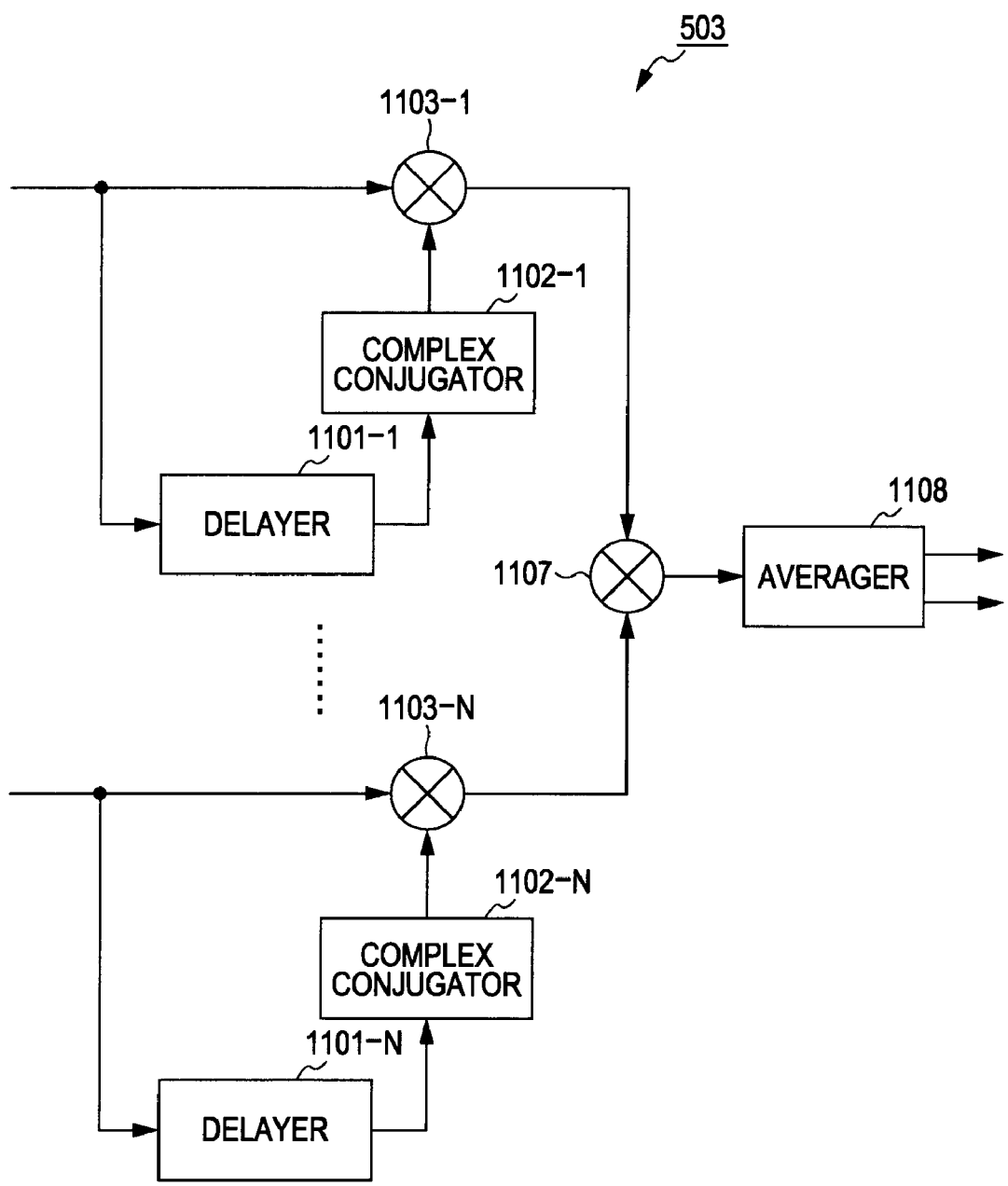
FIG. 11 is a block diagram showing an example of the internal configuration of a frequency offset estimating part in the synchronization circuit unit shown in FIG. 5.

FIG. 11 is a block diagram showing an example of the internal configuration of the frequency offset estimating part 503 in the synchronization circuit unit 122 shown in FIG. 5. The frequency offset estimating part 503 is activated after the packet detecting part 501 detects a packet in the L-STF of the preamble conforming to the IEEE 802.11a/n and calculates the self correlation on the repetition cycle of the LTS in the L-LTF to measure the amount of phase rotation for every repetition period of the LTS. According to the present embodiment of the present invention, if the magnitude of the self correlation calculated by the frequency offset estimating part 503 is lower than a predetermined threshold value, the controller 505 cancels the detection of the packet to start detection of a packet again.

Referring to FIG. 11, a delayer 1101 of each reception antenna branch holds received signals corresponding to the repetition period of the LTS and outputs a delay signal. A complex conjugater 1102 of each reception antenna branch calculates the complex conjugate of the delay signal output from the delayer 1101. A multiplier 1103 of each reception antenna branch performs the complex conjugate multiplication of the received signal by the delay signal corresponding to the repetition period of the LTS. The complex conjugate multiplication is performed for every reception antenna branch. An adder 1107 adds up the results of the complex conjugate multiplication and an averager 1108 calculates the average of the sums calculated by the adder 1107, thereby calculating the self correlation on the repetition cycle of the LTS in the L-LTF.

The phase component of the self correlation calculated here indicates the phase rotation during the repetition period of the LTS and is used in the correction in the oscillator 507 as the frequency offset.

When the controller 505 receives the self correlation calculated by the frequency offset estimating part 503, the controller 505 calculates the strength of the self correlation (that is, the absolute value of the self correlation) and compares the absolute value of the self correlation with a predetermined threshold value to reconfirm whether the pattern of the L-LTF is detected.

If the absolute value of the self correlation (that is, the amplitude component) is lower than the predetermined threshold value, the controller 505 determines that the packet is erroneously detected by the packet detecting part 501. In this case, the controller 505 issues a reset instruction to the packet detecting part 501 to cancel the detection of the packet and causes the packet detecting part 501 to start detection of a packet from a received signal again. The controller 505 also issues a reset instruction to each of the timing estimating part 502, the frequency offset estimating part 503, and the noise estimating part 504 to cause each estimating part to perform the estimation based on a packet that is detected again.

Figure 12:
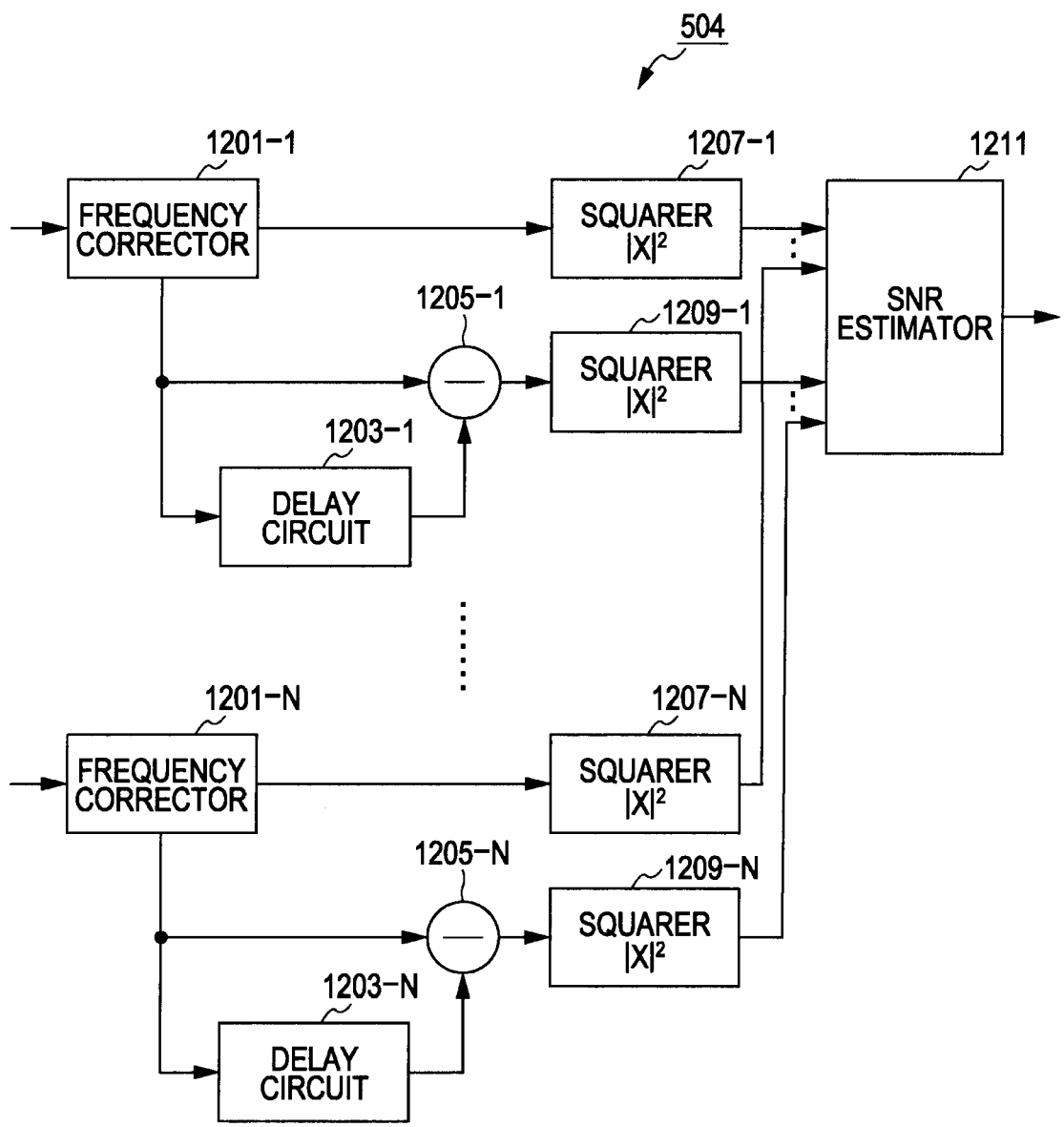
FIG. 12 is a block diagram showing an example of the internal configuration of a noise estimating part in the synchronization circuit unit shown in FIG. 5.

FIG. 12 is a block diagram showing an example of the internal configuration of the noise estimating part 504 in the synchronization circuit unit 122 shown in FIG. 5. The noise estimating part 504 is activated after the packet detecting part 501 detects a packet in the L-STF of the preamble conforming to the IEEE 802.11a/n and calculates the signal power and the noise power on the repetition cycle of the LTS in the L-LTF to estimate the SNR. According to the present embodiment of the present invention, if the SNR calculated by the noise estimating part 504 is lower than a predetermined threshold value, the controller 505 cancels the detection of the packet to start detection of a packet again.

Referring to FIG. 12, a frequency corrector 1201 of each reception antenna branch corrects the frequency offset of a received signal. A delay circuit 1203 of each reception antenna branch generates a delay signal corresponding to the repetition period of the LTS. A differencer 1205 of each reception antenna branch calculates the difference during the repetition period to extract the noise component. A squarer 1209 of each reception antenna branch calculates the square of the difference to obtain the noise power. A squarer 1207 of each reception antenna branch calculates the square of the signal to obtain the signal power. An SNR estimator 1211 receives the signal power and the noise power calculated for every reception antenna branch to estimate the SNR on the basis of the ratio between these square values.

When the controller 505 receives the SNR estimated by the noise estimating part 504, the controller 505 compares the SNR with a predetermined threshold value to reconfirm whether the pattern of the L-LTF is detected.

If the SNR is lower than the predetermined threshold value, the controller 505 determines that the packet is erroneously detected by the packet detecting part 501. In this case, the controller 505 issues a reset instruction to the packet detecting part 501 to cancel the detection of the packet and causes the packet detecting part 501 to start detection of a packet from a received signal again. The controller 505 also issues a reset instruction to each of the timing estimating part 502, the frequency offset estimating part 503, and the noise estimating part 504 to cause each estimating part to perform the estimation based on a packet that is detected again.

As described above, in the receiver apparatus according to the embodiments of the present invention, the synchronization circuit unit 122 reconfirms the presence of a packet with various indexes calculated in the estimation of the timing, the frequency offset, the SNR, and channel after a packet is detected. Accordingly, it is possible to improve the precision of the packet detection without missing an opportunity for collection of the information necessary for the demodulation.

The receiver apparatus according to the embodiments of the present invention introduces the reset during the collection of the information, such as the reception timing of a packet, the frequency offset, and the SNR, necessary for the demodulation even if the packet detecting part 501 in the synchronization circuit unit 122 erroneously detects a packet in a signal other than a desired preamble to prevent unnecessary decoding of the subsequent symbols. Accordingly, the packet detection can be quickly started again even during the period from the erroneous detection of a packet to the detection of a packet error to increase the communication capacity. The packet detection is suppressed during the above period in the related art.

With the receiver apparatus according to the embodiments of the present invention, it is possible to improve the sensitivity of the first packet detection to increase the communication capacity in the part where the SNR is low and to expand the communication range.

The present application contains subject matter related to that disclosed in Japanese Priority Patent Application JP 2008-208205 filed in the Japan Patent Office on Aug. 12, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A synchronization circuit comprising:
   a packet detecting unit that searches a received signal for a preamble that is added to the beginning of a packet and that includes given repetitive training sequences to detect the packet;
   a packet detection reconfirming unit that reconfirms the packet detection by the packet detecting unit by using the received signal in a field in the preamble, subsequent to the field where the packet detecting unit has detected the packet; and
   a control unit that cancels the packet detection by the packet detecting unit in response to the packet detection reconfirming unit that detects erroneous detection of the packet by the packet detecting unit to cause the packet detecting unit to start detection of the packet from the received signal again.

2. The synchronization circuit according to claim 1, wherein the packet detecting unit calculates a moving average of the result of complex conjugate multiplication of each received signal by a delay signal that is received one repetition period of the given training sequences before the received signal to obtain a self correlation value of the received signal and determines whether the packet is detected on the basis of the result of comparison between the self correlation values.

3. The synchronization circuit according to claim 1, further comprising:
   an estimating unit that estimates at least one of a reception timing of the packet, a frequency offset, and a signal-to-noise ratio by using the received signal in a field in the preamble, subsequent to the field where the packet detecting unit has detected the packet,
   wherein the control unit resets the estimation by the estimating unit in response to the packet detection reconfirming unit that detects erroneous detection of the packet by the packet detecting unit to cause the estimating unit to perform the estimation based on the packet that is detected again.

4. The synchronization circuit according to claim 1, wherein the packet detection reconfirming unit compares the magnitude (absolute value) of a cross correlation function between a given signal to be included in the preamble and the received signal at a peak position of the cross correlation function with a predetermined threshold value to reconfirm whether the packet is detected by the packet detecting unit.

5. The synchronization circuit according to claim 1, further comprising:
a timing estimating unit that estimates a timing on the basis of a peak position of a cross correlation function between a given signal and the received signal for timing estimation,
wherein the packet detection reconfirming unit compares the magnitude (absolute value) of the cross correlation function estimated by the timing estimating unit at the peak position of the cross correlation function with a predetermined threshold value to reconfirm whether the packet is detected by the packet detecting unit.

6. The synchronization circuit according to claim 1, wherein the packet detection reconfirming unit compares the absolute value of a self correlation value of the received signal during the repetition period of the given training sequences with a predetermined threshold value to reconfirm whether the packet is detected by the packet detecting unit.

7. The synchronization circuit according to claim 1, further comprising:
a frequency offset estimating unit that calculates a self correlation value of the received signal during the repetition period of the given training sequences to estimate a phase rotation during the repetition period of the given training sequences from the phase of the self correlation value,
wherein the packet detection reconfirming unit compares the absolute value of the self correlation value calculated by the frequency offset estimating unit with a predetermined threshold value to reconfirm whether the packet is detected by the packet detecting unit.

8. The synchronization circuit according to claim 1, further comprising:
a noise estimating unit that uses the given training sequences of the received signal to calculate a signal-to-noise ratio,
wherein the packet detection reconfirming unit compares the signal-to-noise ratio calculated by the noise estimating unit with a predetermined threshold value to reconfirm whether the packet is detected by the packet detecting unit.

9. A synchronization method comprising the steps of:
searching a received signal for a preamble that is added to the beginning of a packet and that includes given repetitive training sequences to detect the packet;
estimating at least one of a reception timing of the packet, a frequency offset, and a signal-to-noise ratio by using the received signal in a field in the preamble, subsequent to the field where the packet has been detected;
reconfirming the packet detection by using the received signal in a field in the preamble, subsequent to the field where the packet has been detected; and
canceling the packet detection to start detection of the packet from the received signal again and resetting the estimation to perform the estimation based on the packet that is detected again, in response to detection in the packet detection reconfirming step of erroneous detection of the packet in the packet detecting step.

10. A wireless communication apparatus comprising:
a receiving unit that receives a signal including a packet having a preamble including given repetitive training sequences, the preamble being added to the beginning of the packet;
a packet detecting unit that searches the received signal for the preamble to detect the packet;
an estimating unit that estimates at least one of a reception timing of the packet, a frequency offset, and a signal-to-noise ratio by using the received signal in a field in the preamble, subsequent to the field where the packet detecting unit has detected the packet;
a packet detection reconfirming unit that reconfirms the packet detection by the packet detecting unit by using the received signal in a field in the preamble, subsequent to the field where the packet detecting unit has detected the packet; and
a control unit that cancels the packet detection by the packet detecting unit to cause the packet detecting unit to start detection of the packet from the received signal again and resets the estimation by the estimating unit to cause the estimating unit to perform the estimation based on the packet that is detected again, in response to the packet detection reconfirming unit that detects erroneous detection of the packet by the packet detecting unit.

11. A wireless communication method comprising the steps of:
receiving a packet having a preamble including given repetitive training sequences, the preamble being added to the beginning of the packet; searching the received signal for the preamble to detect the packet;
estimating at least one of a reception timing of the packet, a frequency offset, and a signal-to-noise ratio by using the received signal in a field in the preamble, subsequent to the field where the packet has been detected;
reconfirming the packet detection by using the received signal in a field in the preamble, subsequent to the field where the packet has been detected; and
canceling the packet detection to start detection of the packet from the received signal again and resetting the estimation to perform the estimation based on the packet that is detected again, in response to detection in the packet detection reconfirming step of erroneous detection of the packet in the packet detecting step.

12. A non-transitory computer-readable storage medium encoded with instructions that, when executed on a processor, cause a computer to perform a process for synchronization of a received signal, the process comprising:
searching a received signal for a preamble that is added to the beginning of a packet and that includes given repetitive training sequences to detect the packet;
estimating at least one of a reception timing of the packet, a frequency offset, and a signal-to-noise ratio by using the received signal in a field in the preamble, subsequent to the field where the packet has been detected;
reconfirming the packet detection by using the received signal in a field in the preamble, subsequent to the field where the packet has been detected; and
canceling the packet detection to start detection of the packet from the received signal again and resetting the estimation to perform the estimation based on the packet that is detected again, in response to detection in the packet detection reconfirming step of erroneous detection of the packet in the packet detecting step.

13. The non-transitory computer-readable storage medium according to claim 12, the method further comprising calculating a moving average of the result of complex conjugate multiplication of each received signal by a delay signal that is received one repetition period of the given training sequences before the received signal to obtain a self correlation value of the received signal and determines whether the packet is detected on the basis of the result of comparison between the self correlation values.

14. The non-transitory computer-readable storage medium according to claim 12, the method further comprising comparing a magnitude (absolute value) of a cross correlation function between a given signal to be included in the preamble and the received signal at a peak position of the cross correlation function with a predetermined threshold value to reconfirm whether the packet is detected.

15. The non-transitory computer-readable storage medium according to claim 12, wherein the reception timing is estimated based on a peak position of a cross correlation function between a given signal and the received signal for timing estimation.

16. The non-transitory computer-readable storage medium according to claim 15, wherein reconfirming the packet detection includes comparing a magnitude (absolute value) of the cross correlation function estimated by the timing estimating unit at the peak position of the cross correlation function with a predetermined threshold value.

17. The non-transitory computer-readable storage medium according to claim 12, wherein reconfirming the packet detection includes comparing an absolute value of a self correlation value of the received signal during the repetition period of the given training sequences with a predetermined threshold value.

18. The non-transitory computer-readable storage medium according to claim 12, wherein the frequency offset is estimated by calculating a self correlation value of the received signal during the repetition period of the given training sequences to estimate a phase rotation during the repetition period of the given training sequences from the phase of the self correlation value.

19. The non-transitory computer-readable storage medium according to claim 18, wherein reconfirming the packet detection comprising comparing an absolute value of the self correlation value with a predetermined threshold value.

20. The non-transitory computer-readable storage medium according to claim 12,
wherein the signal-to-noise ratio is estimated using the given training sequences of the received signal, and
wherein reconfirming the packet detection comprises comparing the signal-to-noise ratio with a predetermined threshold value to reconfirm whether the packet is detected.

\* \* \* \* \*